United States Patent
Ino et al.

[11] Patent Number: 6,104,734
[45] Date of Patent: Aug. 15, 2000

[54] SOLID STATE LASER APPARATUS

[75] Inventors: Tadao Ino, Hino; Hirofumi Sukeda, Tokorozawa; Hideki Saga, Kokubunji; Hiroshi Toyama, Hachioji; Tsuyoshi Miyai, Fukaya, all of Japan

[73] Assignees: Hitachi, Ltd.; Hitachi Metals, Ltd., both of Tokyo, Japan

[21] Appl. No.: 09/326,979

[22] Filed: Jun. 3, 1999

[30] Foreign Application Priority Data

Jun. 3, 1998 [JP] Japan .................................. 10-154087

[51] Int. Cl.⁷ ...................................................... H01S 3/10
[52] U.S. Cl. ................................ 372/26; 372/22; 372/38; 372/33
[58] Field of Search ................................ 372/22, 26, 38, 372/43; 332/144; 430/945

[56] References Cited

U.S. PATENT DOCUMENTS

| | | | |
|---|---|---|---|
| 3,586,997 | 6/1971 | Kinsel | 331/94.5 |
| 4,989,212 | 1/1991 | Mercherle | 372/26 |
| 5,048,029 | 9/1991 | Skupsky et al. | 372/26 |
| 5,068,546 | 11/1991 | Hemmerich et al. | 359/328 |

*Primary Examiner*—Robert H. Kim
*Assistant Examiner*—Gioacchino Inzirillo
*Attorney, Agent, or Firm*—Antonelli, Terry, Stout & Kraus, LLP

[57] ABSTRACT

In order to eliminate noise of a solid state laser apparatus generating a blue light wave, the solid state laser apparatus comprises a solid state laser light source, an optical modulator having a light modulating function and outputting the modulated light therefrom as a desired light output, a photo-detector converting one part of output light from the solid state laser light source to an electrical signal, an electrical circuit detecting a noise component from the electrical signal and moving the phase of an electrical signal corresponding to the noise component, and a controller for applying the output signal of the electrical circuit to the optical modulator so as to substantially eliminate light of the blue light wave corresponding to the noise component so as to provide the desired light output from the optical modulator.

7 Claims, 2 Drawing Sheets

SOLID STATE LASER APPARATUS

BACKGROUND OF THE INVENTION

This invention relates to a solid state laser apparatus such as a stabilized light source device stabilizing an intensity of optical beam from a laser light source. In particular, a solid state laser apparatus, such as a solid state blue SHG (Second Harmonic Generation) laser, which is useful for an optical device necessitating low noise at high frequency.

DESCRIPTION OF PRIOR ART

At present, a solid state laser apparatus using a solid state blue SHG (Second Harmonic Generation) laser as a light source which generates a high frequency light having wavelength of about 340 nm is under development. Such a solid state laser apparatus generating high frequency light has attracted considerable attention, in the field of high-density recording in medical use, or in measurement use. However, the solid state laser apparatus has not been sufficiently used due to the generation of high frequency noise. Particularly, the solid state blue SHG laser inevitably generates noise.

The cause of the noise has been considered to be a mode hopping by the competition between modes. The high frequency noise hinders the further application development in an industrial field.

The first known method for stabilizing a light of blue SHG laser is disclosed in Appl. Phys. Lett., Vol. 56, No-23, Jun. 4, 1990" by W. J. Kozlovsky and W. Lenith as "Generation of 41 mW of blue radiation by frequency doubling of a GaAlAs diode laser". In the first known method, one part of the blue SHG laser output light is fed back to a driving current of the semiconductor laser. But, the first known stabilizing method has such a drawback that the light of the semiconductor laser is influenced by an external light for the sake of the SHG system.

Furthermore, a second known stabilizing method for stabilizing a light of a blue SHG laser is disclosed in (17th Annual Meeting of the Laser Society of Japan. Digest of Technical Paper "Application of LD Pumped Cr:LiSAF Laser to Blue SHG Laser" by SATOU MASAZUMI, MAKIO SATOSI, ANDOU TETUO, MIYAZAKI TATESI, Jan. 23, 1997). The second known stabilizing method reduces high frequency noise by inserting an etalon in the laser resonator and by making the oscillation mode a single mode. However the etalon is influenced by mechanical vibration, and there is an obstruction in commercialization of the stabilizing method.

Furthermore, in order to reduce high frequency noise of the solid state blue SHG laser, a third stabilizing method has been experimented by present inventors. The third stabilizing method is a method in that one part of the blue SHG laser is converted to an electrical signal, and the level or offset of the electrical signal is controlled by use of a divider and is used as driving current for an optical modulator. In the third stabilizing method, the optical modulator does not diffract the high frequency noise component and only a desired light beam is diffracted.

The third stabilizing method is a useful method to eliminate the noise component. However, by the experiment, it has been determined that a time delay from when one part of the light signal is converted to an electrical signal until the electrical signal is used for driving the optical modulator, is about 200 nsec. In the process which an optical modulator reduces the noise part, the delay time of the optical modulator is about 200 nsec. Consequently, the third stabilizing method cannot eliminate noise perfectly. By experiment, it has been determined that the solid state laser apparatus performing the third stabilizing method has about 12% of laser light noise.

It is known that laser light noise should be within ±3.5% so that a solid state laser apparatus may be usable effectively as a light source of an optical communication apparatus.

SUMMARY OF THE INVENTION

Accordingly, an object of this invention is to improve a solid state laser apparatus in accordance with the third stabilizing method, and provide a solid state laser apparatus which reduces remaining noise which is dependent upon the time delay of an optical modulator.

Another object of this invention is to provides a solid state blue SHG (Second Harmonic Generation) laser in which noise included in the laser light thereof is not influenced by a external light, and is within ±3.5%.

In order to attain the above objects, a solid state laser apparatus according to this invention, comprises:

a solid state laser light source generating a light wave;

an optical modulator having a function of modulating the output light of the solid state laser light source and outputting a light therefrom as a desired light output;

a photo-detector for converting one part of the output light from the solid state laser light source to an electrical signal;

an electrical circuit for detecting an electrical signal corresponding to the noise component; and a controller for applying the output signal of the electrical circuit to the optical modulator so as to eliminate the light of the noise component from the light from the solid state laser light source.

A preferred embodiment of the electrical circuit includes a division circuit for dividing a predetermined reference voltage by an output from said photodetector, a differential circuit for differentiating the electric signal to detect a rise up and falling down of the noise component in the electric signal, a circuit for adding the output of the differential circuit with the output of the division circuit and for applying the output of the adder circuit to the light modulator.

By this invention, since the phase of an electrical signal being added to the optical modulator through the electrical circuit is advanced by the time delay of the optical modulator in comparison with a noise of an output from a solid state laser light source in which the electrical signal is added to the optical modulator directly, the light corresponding to the noise component can be separated and eliminated from the desired light output. Therefore, the ratio between noise component and the desired light output is reduced.

DESCRIPTION OF EMBODIMENTS

Figure 1:
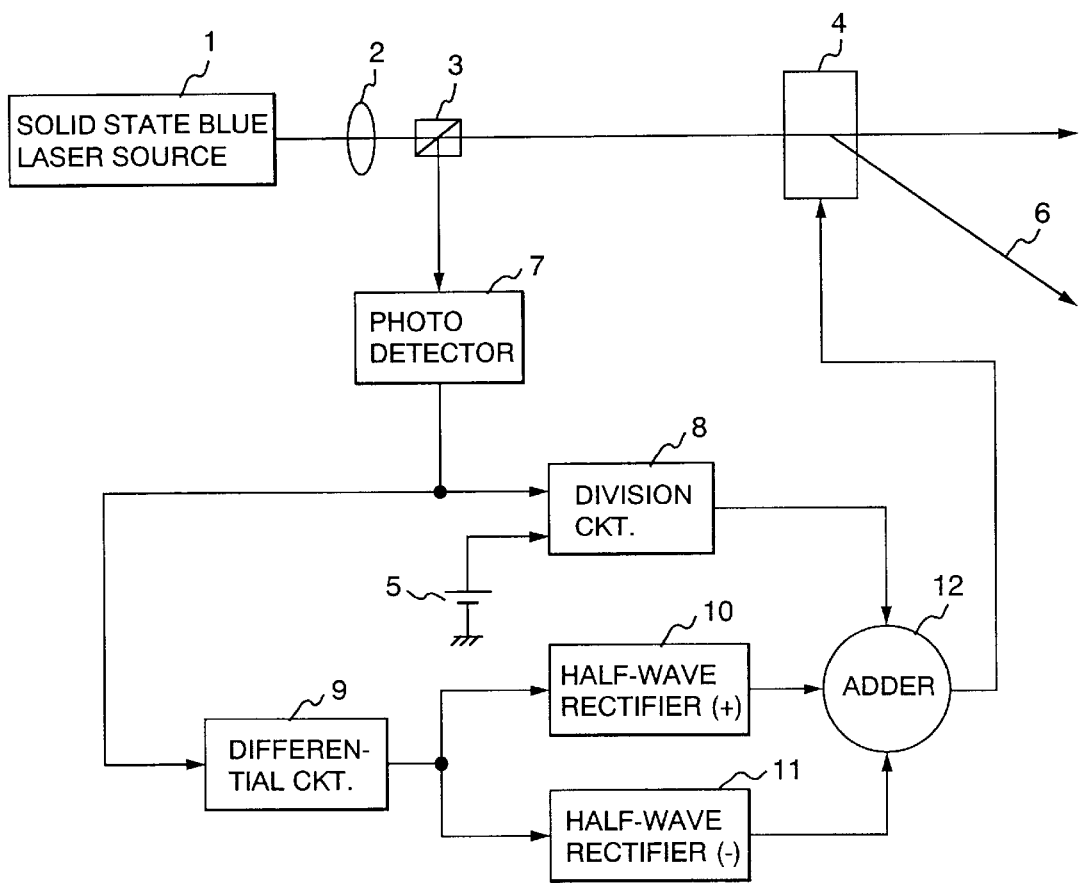
FIG. 1 shows a block diagram of one embodiment of a solid state laser apparatus according to this invention.

FIG. 1 shows a block diagram of one embodiment of a solid state laser apparatus according to this invention.

This embodiment uses a solid state blue SHG laser as a laser 1, and reduces a noise component from the output light of the laser 1.

As shown in FIG. 1, this embodiment comprises an optical system and an electrical circuit.

The optical system includes a solid state blue SHG laser light source 1 being a laser light generator, condenser lens 2 for converging the laser light, a beam splitter 3 for dividing the laser light into two parts, and an optical modulator 4 which diffracts the laser light.

The electrical circuit includes a light detecting circuit or photodetector 7 for converting the laser light to an electrical signal, a division circuit 8 for dividing a reference voltage 5 by the electrical signal, a differential circuit 9 for differentiating the output signal from the light detecting circuit 7, a half-wave rectifier (+)10 and a half-wave rectifier (−)11 for rectificating the output electrical signal of the differential circuit 9, an adder circuit 12 for adding the half-wave rectified electrical signals and the divided electrical signal with the output of adder circuit 12 being utilized for control of the optical modulator 4.

A laser light generated from the solid state blue laser source 1 is condensed by condensing lines 2 and is divided by the beam splitter 3. One part of the output from the beam splitter 3 is bent by 90 degrees and is supplied to the light detecting circuit 7. On the other hand, another part of the output from the beam splitter 3 is supplied to the optical modulator 4.

The optical modulator 4 can obtain a diffraction light 6 of which a high frequency noise component is reduced, by use of the signal from the electrical circuit, so that the laser light may be diffracted and the high frequency noise component may not be diffracted.

The operation of the electrical circuit will be explained hereinafter. In the light detection circuit 7, a laser light is converted into an electrical signal, and is sent to both the dividing circuit 8 and the differential circuit 9. In the dividing circuit 8, a voltage of the reference voltage source 5 setting a target value serves as a dividend, and the electrical signal converted from the laser light serves as a divisor.

On the other hand, in differential circuit 9, a differential wave pattern is made so as to detect a rising edge and a falling edge of a noise signal. This differential wave pattern is separated to a rising edge and a falling edge by use of the half-wave rectifier (+)10 and the half-wave rectifier (−)11, respectively. The level of the differential wave pattern is changeable. Further, in adder circuit 12, the quotient of the division circuit 8 is added with the detected rising and falling edge waves. The sum of the adder circuit 12 is used as a driving signal for the optical modulator 4.

Figure 2:
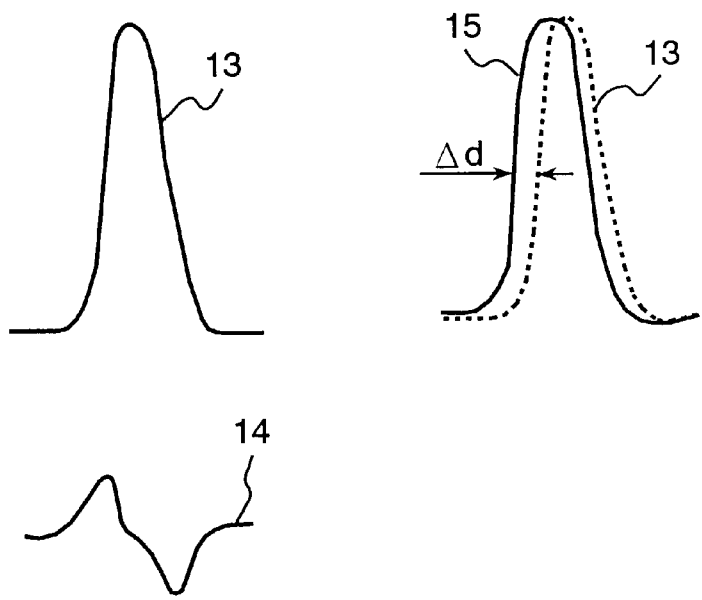
FIG. 2 shows waveforms of electrical signal for explaining an embodiment of a solid state laser apparatus according to this invention.

FIG. 2 shows signal waveforms in principal parts of the embodiment. The reason that phase of electrical signal is advanced substantially, will be explained in connection with FIG. 2.

Differentiated waveform 14 of the differential circuit 9 is rectified in the half-wave rectifiers 10 and 11. The output of the division circuit 8 and the outputs of rectifiers 10 and 11 are added in adder circuit 12. The output signal of the adder circuit 12 has a waveform 15 as shown FIG. 2 which is composite waves of the noise signal waveform after the division and the noise signal waveform after the difference. The waveform 15 is approximate to a wave which is moved forward by time Δd with respect to the phase of a wave 13 of the noise component. The time Δd may be changed by a time constant of the differential circuit 9 so that the time Δd may be equal to the time delay of the optical modulator 4 (for example 200 nsec).

Figure 3:
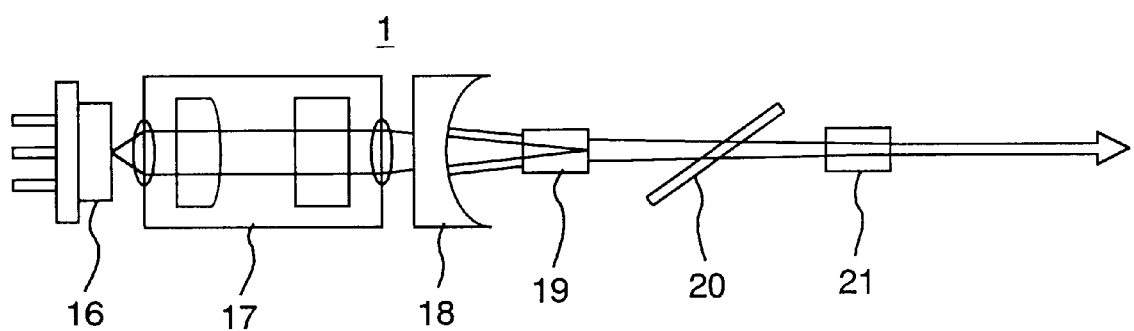
FIG. 3 shows a block diagram of a solid state blue laser source in FIG. 1.

FIG. 3 shows a block diagram constituting a solid state blue SHG laser 1 in FIG. 1.

The solid state blue SHG laser 1 comprises a semiconductor laser 16 generating a laser beam having wavelength of 680 nm, a beam compensation lens 17 which leads the laser beam from semiconductor laser 16 to a Cr:LiAl crystal 19, a laser mirror 18, a wavelength control element 20, and a SHG crystal 21 such as a $LiB_3O$ crystal. The Cr:LiAl crystal 19 is excited by the laser beam having wavelength of 680 nm, and generates a wide band laser light having peak at about 860 nm. By using the wavelength control element 20, a fundamental or dominant wave which may be phase matched with the SHG crystal 21 is selected. The intensity of the dominant wave is strengthened by inner resonance between the laser mirror 18 and the output side surface of SHG crystal 21. And by the SHG crystal 21, the dominant wave is converted to a second harmonic wave, that is, a frequency doubled wave having wavelength of about 430 nm.

As described above, in the embodiment, the noise component of the optical beam is separated from a desired light beam timely, because a phase of a signal driving the optical modulator is advanced approximately to the time delay of the optical modulator. Accordingly, the delay of optical modulator is compensated and voltage is added to the modulator. Accordingly, delay of optical modulator is compensated.

Although one embodiment according to this invention is explained above, this invention is not limited to the embodiment. This invention is useful for a solid state blue SHG laser particularly, but, generally, this invention is applicable for a solid state laser apparatus having noise problem with respect to time delay of an optical modulator. The apparatus or circuits described herein for moving an electrical signal corresponding to high frequency noise forward may be replaced by other apparatus or circuits as known to those of ordinary skill in the art.

This invention can compensate for the time delay of an optical modulator by an electrical circuit composed of a differential circuit, rectifying circuit, and an adder circuit.

By experiment, the noise ratio depending on high frequency noise of this invention has been reduced to a level of 3.5%, on the other hand the noise ratio of conventional apparatus using the same solid state SHG laser as a solid state SHG laser used in this invention, is 12%. By this invention, a solid state blue laser may be applicable for measurement devices, an optical recording devices, a disk mastering device, a particle counter, a high speed laser beam printer, a medical and biography device, a holography, etc.

What is claimed is:

1. A solid state laser apparatus comprises:
   a light source having a solid state laser which generates a fundamental wave and a frequency doubler which converts the fundamental wave to a second harmonic wave as an output light;
   an optical modulator which modulates the output light of said frequency doubler and outputs light therefrom as desired light output;
   a photo-detector which converts one part of the output light from said frequency doubler to an electrical signal;
   an electrical circuit which detects a noise component from said electrical signal and provides an output signal indicative thereof; and
   a controller which applies the output signal of the electrical circuit to the optical modulator so as to substantially eliminate the light of the noise component from the light from said light source.

2. A solid state laser apparatus according to claim 1, wherein said electrical circuit includes circuit means for moving the phase of an electrical signal corresponding to the noise component forward.

3. A solid state laser apparatus according to claim 2, wherein said circuit means includes:

a division circuit which divides a predetermined reference voltage by an output from said photo-detector;

a differential circuit which differentiates said electrical signal so as to detect a rise up and a falling down of the noise component; and an adder circuit for adding the output of the division circuit with the output of said differential circuit, and for applying the output of said adder circuit to said optical modulator.

4. A solid state laser apparatus according to claim 2, wherein said light source is a solid state blue SHG laser light source.

5. A light generating apparatus having a solid state SHG laser which generates a second harmonic wave which is applied to an optical modulator and a noise reducer which reduces a noise component included in the second harmonic wave, wherein said noise reducer comprises:

a photo-detector which converts one part of an output from said SHG laser to an electrical signal;

an electrical circuit for which detects a noise component in the electrical signal and which moves forward a phase of the noise component in the electric signal; and an applicator which applies an output of the electrical circuit to the optical modulator so as to substantially eliminate light of the second harmonic wave corresponding to the noise component.

6. A light generating apparatus according to claim 5, wherein said electrical circuit includes:

first means for dividing a predetermined reference voltage by said electrical signal;

second means for differentiating said electrical signal, third means for half-wave rectifying the differentiated signal obtained by said second means; and means for adding the half-wave rectified electrical signal obtained by said third means and the divided signal obtained by said first means, and for applying the added electrical signal to said optical modulator.

7. A light generating apparatus according to claim 5, wherein said solid state SHG laser generates blue light.

* * * * *